3,389,098
IRRADIATION OF ELASTOMERIC COMPOUNDS
Harold M. Gladstone, Wallingford, Paul M. La Flamme, New Britain, Robert M. Reihsmann, Cheshire, and Herbert M. Schoen, Stamford, Conn., assignors to Quantum, Incorporated, Wallingford, Conn., a corporation of Connecticut
No Drawing. Filed Sept. 16, 1963, Ser. No. 309,207
10 Claims. (Cl. 260—4)

ABSTRACT OF THE DISCLOSURE

The lubricity of vulcanized elastomers having residual carbon-carbon unsaturation is improved by treatment with acrylic acid in the presence of ultraviolet radiation, gamma radiation, or heat in the presence of a thermal initiator, and heating with sulfur tetrafluoride, a complex of sulfur tetrafluoride and boron trifluoride, or a mixture of sodium fluoride and sulfur dichloride.

---

This invention relates to vulcanized elastomeric compounds and more particularly to methods of making various vulcanized elastomeric compounds and particularly high lubricity elastomers and the resulting products thereof.

The long felt need for high lubricity elastomers such as high lubricity neoprene and natural rubber has been present for many years. Nevertheless, in approaching the problem of providing a high lubricity elastomer, those skilled in the art have been confronted with somewhat of a paradox, in that the chemical composition of various elastomers, such as natural rubber, neoprene and the like, is such that the material naturally possesses a relatively high coefficient of friction. In addition, the uses to which such elastomers have been put to date, usually make use of the materials' elasticity and flexibility. Nevertheless, there are requirements where elasticity and flexibility are the prime requirements, but where the attendant frictional properties are decidedly disadvantageous. For example, while an O-ring must be elastic and flexible, it may be advantageous if at least the surface of the O-ring possessed a lower coefficient of friction or high lubricity, in order to diminish wear and deterioration of the O-ring. Another use of high lubricity elastomeric materials is evident when one considers the windshield wiper blade. Here the low friction properties (or high lubricity) of elastomeric materials would be highly desirable since low friction between the glass and the wiper would require a less powerful motor for reciprocating the wipers.

Further uses of high lubricity elastomeric materials are readily evident when one considers shaft seals, window channel guides for automobiles, non-stick gaskets, packings, rollers, diaphragms, weather-stripping and the like.

In attacking the problem of reducing the friction of the normal elastomeric materials such as natural rubber, neoprene and the like, the prior art approaches have been anything but satisfatcory. The usual approach is to incorporate some lubricating material into the base composition or to coat the elastomeric material with a lubricant. These have involved the addition of graphite, molybdenum disulfide, wax, Teflon, or oils to the composition, which leads to disappointing results, mainly because sufficient additive to sustain the lubrication function causes serious loss of the desired physical properties. Tear and tensile strengths and elasticity are seriously reduced. Similarly superficial coatings of lubricants, such as Teflon dispersions and graphite, are quickly lost and only result in temporary reduction of the friction coefficient.

In the prior art there have also been attempts at halogenizing natural rubber and the like, but this usually results in severe problems, in either fabricating the part or in maintaining the desired physical properties of the base material. Flame-hardening has been employed but the resultant decrease in frictional properties is at the expense of the basic properties of the material.

Finally, there have been some recent theoretical prior art approaches which have been somewhat enlightening in their broad disclosure of suitable ways of approaching the problem and these involve techniques considered by the instant inventors, but discarded because the principles do not apply to specific materials under specific circumstances, etc. for instance, research by the assignee of the instant application initially considered the idea of graft polymerization of hydrolyzable monomers or oligomers to the surface of natural rubber and the subsequent conversion of the graft polymer to a fluorinated form. This approach was based upon the grafting of methyl acrylate to the surface of natural rubber and the subsequent hydrolysis to the corresponding acid form which in turn was followed by fluorination of the acid with sulfur tetrafluoride. The use of sulfur tetrafluoride, as a fluorinating agent, permitted controlled fluorination of certain active chemical groups such as COOH and in this instance resulted in a trifluorinated terminal carbon. Ultraviolet radiation was used to activate the natural rubber surface during the initial graft polymerization step and the fluorination reaction of necessity had to be carried out in a pressure reactor at steam temperatures.

While the last-mentioned approach of the assignee of the instant invention proved the feasibility of proceeding with the development of high lubricity natural rubber, the process is limited, cumbersome, costly and, in a great many respects, uneconomical.

The applicants of the instant invention have discovered economical methods for the production of high lubricity vulcanized elastomers which are free from the defects of the prior art and result in the production of a high lubricity product, which possess low frictional properties while retaining for the most part the basic characteristics of the base material.

We have also found that radiation is not always essentital to producing high lubricity surface characteristics, particularly on automotive parts which are subjected to constant frictional contact and abrasion.

In view of the foregoing, the shortcomings of the prior art are overcome and the objectives of this invention are realized by providing new and improved methods for treating elastomeric materials.

Another object of our invention is to provide new and improved elastomeric materials and articles which possess unique properties heretofore uncontemplated by the prior art.

Still another object of our invention is to provide new and improved elastomeric materials and articles which possess new and improved surface lubricity characteristics for highly specialized applications in the automotive and related fields.

A further object of our invention is to provide new and improved methods for treating selected elastomeric materials, particularly, after vulcanization, to improve the surface lubricity of the materials while basically retaining the inherent flexibility and elasticity characteristics thereof.

Another object of our invention is to provide new and improved polymerization methods for treating selected elastomeric materials.

Still another object of our invention is to provide new and improved graft polymerization methods for treating vulcanized elastomeric materials.

Other objects of the invention will in part be obvious and will in part appear hereinafter.

The invention accordingly comprises the several steps and the relation of one or more of such steps with respect to each of the others, and the articles and compositions possessing the features, properties and the relation of constituents, which are exemplified in the following detailed disclosure, and the scope of the invention will be indicated in the claims.

Proceeding according to the instant method, it is important to note that the invention is particularly directed to the treatment of vulcanized elastomers chosen from the group consisting essentially of natural rubber polychloroprene rubber (neoprene), acrylonitrile butadiene rubber (Buna N), styrene butadiene rubber (SBR), polybutadienes and vulcanized elastomers with high carbon-carbon unsaturation. In addition, the objectives of the particular methods are to change the surface of the material while retaining the high elasticity, flexibility, etc., of the underlying material.

Accordingly, the invention envisioned is directed to the chemical or physical incorporation of novel chemical entities into the surface of the vulcanized elastomeric material.

Method A.—We have discovered that in order to attain the desired objectives of the present invention, it is necessary to proceed in a particular manner, utilizing specific techniques under controlled conditions.

The invention envisions a method for the treatment of vulcanized elastomers that have residual carbon-carbon unsaturation and are selected from the class consisting of natural rubber, polychloroprene rubber (neoprene), acrylonitrile butadiene rubber, styrene butadiene rubber and polybutadienes by coating the surface of the elastomeric material with a vinyl compound then exposing the thus treated elastomeric material to radiation or heat treatment and thereafter exposing the surface of the thus treated plastic material to a halogenated sulfur derivative. Preferably the elastomeric article is immersed or soaked in the vinyl material. Although purely by way of exemplification acrylic and methacrylic derivatives are mentioned, it should be understood that the invention is not restricted to these specific materials but is broadly applicable to the production of surface lubricity with hydrolyzable vinyl derivatives which generate a surface which is capable of reacting with halogenating reagents, such as sulfur tetrafluoride and mixtures of sulfur dichloride and sodium fluoride, the latter mixtures being preferred for economical reasons.

Exemplary of the production of low friction coefficient surfaces in the application of the method of the invention are the following:

A. ACRYLATE ESTER GRAFTS—HYDROLYSIS METHOD

Example 1.—Methyl acrylate-Natural rubber (a) Wash rubber sample with soap and water to remove surface contamination
(b) Rinse sample with acetone to remove oils, waxes, residual soaps and water
(c) Soak sample in methylacrylate monomer
(d) Expose sample to ultraviolet light from a quartz envelop mercury burner
(e) Hydrolyze the poly-(methylacrylate) graft to the sodium salt of poly-(acrylic acid) by immersion of the sample for 10 minutes in boiling 20% sodium hydroxide
(f) Convert the sodium salt of the grafted poly-(acrylic acid) to the acid form by immersion of the sample for 10 minutes in hot hydrochloric acid
(g) Vacuum dry to remove all traces of water
(h) Expose sample to excess sulfur tetrafluoride for 24 hours at a temperature of 120° centigrade and autogenous pressure
(i) Soak treated sample in water for 2 hours to remove water soluble $SF_4$ reaction products
(j) Vacuum dry sample to remove water and other volatiles.

The above treated sample shows a marked reduction of coefficient of friction.

Example 2.—Methyl acrylate-Acrylonitrile butadiene rubber (a) Wash rubber sample with soap and water to remove surface contamination
(b) Rinse sample with acetone to remove oils, waxes, residual soap and water
(c) Soak sample in methyl acrylate monomer
(d) Expose sample to ultraviolet light from a quartz envelop mercury burner
(e) Hydrolyze the poly-(methylacrylate) graft to the sodium salt of poly-(acrylic acid) by immersion of the sample for 10 minutes in boiling 20% sodium hydroxide
(f) Convert the sodium salt of the grafted poly-(acrylic acid) to the acid form by immersion of the sample for 10 minutes in hot hydrochloric acid
(g) Vacuum dry to remove all traces of water
(h) Expose sample to excess amount of sulfur tetrafluoride for 24 hours at a temperature of 120° C. and autogenous pressure
(i) Soak treated sample in water for two hours to remove water soluble $SF_4$ reaction products
(j) Vacuum dry sample to remove water and other volatiles.

A sample treated in the above manner will exhibit a marked reduction of coefficient of friction.

Example 3.—Methyl acrylate-Styrene butadiene rubber (a) Wash rubber sample with soap and water to remove surface contamination
(b) Rinse sample with acetone to remove oils, waxes, residual soap and water
(c) Soak sample in methylacrylate monomer
(d) Expose sample to ultraviolet light from a quartz envelop mercury burner
(e) Hydrolyze the poly-(methylacrylate) graft to the sodium salt of poly-(acrylic acid) by immersion of the sample for 10 minutes in boiling 20% sodium hydroxide
(f) Convert the sodium salt of the grafted poly-(acrylic acid) to the acid form by immersion of the sample for 10 minutes in hot hydrochloric acid
(g) Vacuum dry the sample to remove all traces of water
(h) Expose sample to excess amount of sulfur tetrafluoride for 24 hours at a temperature of 120° C. and autogenous pressure
(i) Soak treated sample in water for two hours to remove water soluble $SF_4$ reaction products
(j) Vacuum dry sample to remove water and other volatiles.

A sample treated in the above manner will exhibit a marked reduction of coefficient of friction.

Example 4.—Ethylacrylate-Polychloroprene rubber (a) Wash sample with soap and water to remove surface contamination
(b) Rinse sample with acetone to remove oils, waxes, residual soap and water
(c) Soak sample in ethylacrylate monomer
(d) Expose sample to ultraviolet light from a quartz envelop mercury burner
(e) Hydrolyze the poly-(ethylacrylate) graft to the sodium salt of poly-(acrylic acid) by immersion of the sample for 10 minutes in boiling 20% sodium hydroxide
(f) Convert the sodium salt of the grafted poly-(acrylic acid) to the acid form by immersion of the sample for 10 minutes in hot hydrochloric acid (g) Vacuum dry the sample to remove all traces of water
(h) Expose sample to an excess amount of $SF_4$ for 24 hours at a temperature of 120° C. and autogenous pressure
(i) Soak treated sample in water for two hours to remove all water soluble $SF_4$ reaction products
(j) Vacuum dry sample to remove water and other volatiles.

A sample treated in the above manner will exhibit a marked reduction of coefficient of friction.

Example 5.—Methyl methacrylate-Acrylonitrile butadiene rubber (a) Wash sample with soap and water to remove surface contamination
(b) Rinse sample with acetone to remove oils, waxes, residual soap and water
(c) Soak sample in methyl methylacrylate monomer
(d) Expose sample to ultraviolet light from a quartz envelop mercury burner
(e) Hydrolyze the poly-(methyl methacrylate) graft to the sodium salt of poly-(methacrylic) acid by immersion of the sample for 10 minutes in boiling 20% sodium hydroxide
(f) Convert the sodium salt of the grafted poly-(methacrylic acid) to the acid form by immersion of the sample for 10 minutes in hot hydrochloric acid
(g) Vacuum dry the sample to remove all traces of water
(h) Expose sample to an excess amount of $SF_4$ for 24 hours at a temperature of 120° C. and autogenous pressure
(i) Soak treated sample in water for two hours to remove all water soluble $SF_4$ reaction products
(j) Vacuum dry sample to remove water and other volatiles.

A sample treated in the above manner will exhibit a marked reduction of coefficient of friction.

Example 6.—Methylacrylate-Natural rubber (a) Wash sample with soap and water to remove surface contamination
(b) Rinse sample with acetone to remove oils, waxes, residual soap and water
(c) Soak sample in methylacrylate monomer containing 1% benzoyl peroxide
(d) Heat sample to 120° C. and hold for 10 minutes
(e) Hydrolyze the poly-(methylacrylate) graft to the sodium salt of poly-(acrylic acid) by immersion of the sample for 10 minutes in boiling 20% sodium hydroxide
(f) Convert the sodium salt of the grafted poly-(acrylic acid) to the acid form by immersion of the sample for 10 minutes in hot hydrochloric acid
(g) Vacuum dry the sample to remove all traces of water
(h) Expose sample to an excess amount of $SF_4$ for 24 hours at a temperature of 120° C. and autogenous pressure
(i) Soak treated sample in water for two hours to remove all water soluble $SF_4$ reaction products
(j) Vacuum dry sample to remove water and other volatiles.

A sample treated in the above manner will exhibit a marked reduction of coefficient of friction.

Method B.—In a further embodiment of our invention we have discovered a method whereby grafting of an acrylic monomer in acid form is carried out directly, thereby eliminating hydrolysis of ester groups. When proceeding according to the instant method, the elastomeric material is entirely cleaned by physical scrubbing, to remove mold release agents, separating agents, etc., and other desirable or undesirable foreign matter. In addition, the surface may be cleaned by soaps and detergents or for that matter various chemical solvents such as acetone, trichloroethylene and the like. The thus cleaned elastomeric material is then preferably dried and then contacted with a monomer or mixture of monomers, one of which contains at least one carboxylic acid group. Preferably this contact is discontinued before permanent physical distortion occurs. It is understood, of course, that the conditions of contact are varied as to time, temperature, diluents, and the like depending upon the particular elastomeric compound employed. The thus treated elastomeric material is then exposed to ionizing radiation, such as ultraviolet radiation, gamma radiation or the like. Alternatively, depending upon whether or not a thermal initiator is employed in the monomer contacting step, the thus treated elastomeric material is heated to appropriate temperatures. At this point, depending upon the presence of water or other diluents, the elastomeric material is dried or the surface diluents removed by suitable techniques. The resulting elastomeric material is then brought into contact with $SF_4$, or a mixture of sodium fluoride and sulfur dichloride, or other similar fluorinating agents. By-products may be removed depending upon their nature and the ultimate use of the thus treated elastomeric material. Examples of the procedures of the instant method are as follows:

B. ACRYLIC ACID GRAFTS

Example 7.—Acrylic acid-Acrylonitrile butadiene rubber (a) Wash rubber sample with soap and water to remove surface contamination
(b) Rinse sample with acetone to remove oils, waxes, residual soaps and water
(c) Soak sample in acrylic acid monomer
(d) Expose sample to ultraviolet light from a quartz envelope mercury burner
(e) Expose sample to excess sulfur tetrafluoride one hour at 115° C. and autogenous pressure
(f) Soak treated sample in water for two hours to remove water soluble $SF_4$ reaction products
(g) Vacuum dry sample to remove water and other volatiles.

The above treated sample shows a marked reduction of coefficient of friction.

Example 8.—Acrylic acid-Polychloroprene rubber (a) Wash rubber sample with soap and water to remove surface contamination
(b) Rinse sample with acetone to remove oils, waxes, residual soaps and water
(c) Soak sample in acrylic acid at 60° C. for ½ hour
(d) Expose sample to ultraviolet light from a quartz envelop mercury burner
(e) Expose sample to excess sulfur tetrafluoride one hour at 115° C. and autogenous pressure
(f) Soak treated sample in water for two hours to remove water soluble $SF_4$ reaction products
(g) Vacuum dry sample to remove water and other volatiles.

The above treated sample shows a marked reduction of coefficient of friction.

Example 9.—Acrylic acid-Natural rubber (a) Wash rubber sample with soap and water to remove surface contamination
(b) Rinse sample with acetone to remove oils, waxes, residual soaps and water
(c) Soak sample in acrylic acid at 60° C. for ½ hour
(d) Expose sample to ultraviolet light from a quartz envelop mercury burner
(e) Expose sample to excess sulfur tetrafluoride one hour at 115° C. and autogenous pressure
(f) Soak treated sample in water for two hours to remove water soluble $SF_4$ reaction products
(g) Vacuum dry sample to remove water and other volatiles.

The above treated sample shows a marked reduction of coefficient of friction.

Example 10.—Acrylic acid-SBR rubber (a) Wash rubber sample with soap and water to remove surface contamination
(b) Rinse sample with acetone to remove oils, waxes, residual soaps and water
(c) Soak sample in acrylic acid at 60° C. for ½ hour
(d) Expose sample to ultraviolet light from a quartz envelope mercury burner
(e) Expose sample to excess sulfur tetrafluoride one hour at 115° C. and autogenous pressure
(f) Soak treated sample in water for two hours to remove water soluble $SF_4$ reaction products
(g) Vacuum dry sample to remove water and other volatiles.

The above treated sample shows a marked reduction of coefficient of friction.

Example 11.—Acrylic acid-acrylonitrile butadiene rubber (Buna N)

(a) Wash rubber sample with soap and water to remove surface contamination
(b) Rinse sample with acetone to remove oils, waxes, residual soaps and water
(c) Soak sample in solution consisting of 99 parts acrylic acid and 1 part benzoyl peroxide for ½ hour
(d) Heat treated sample ½ hour at 100° C. in an oven
(e) Expose sample to excess sulfur tetrafluoride one hour at 115° C. and autogenous pressure
(f) Soak treated sample in water for two hours to remove water soluble $SF_4$ reaction products
(g) Vacuum dry sample to remove water and other volatiles.

The above treated sample shows a marked reduction of coefficient of friction.

Example 12.—Acrylic acid-acrylonitrile butadiene rubber (Buna N)

(a) Wash rubber sample with soap and water to remove surface contamination
(b) Rinse sample with acetone to remove oils, waxes, residual soaps and water
(c) Soak sample in acrylic acid monomer
(d) Expose sample to ultraviolet light from a quartz envelope mercury burner
(e) Expose sample to excess sulfur tetrafluoride boron trifluoride complex for 1 hour at 125° C. and autogenous pressure
(f) Soak treated sample in water for two hours to remove water soluble $SF_4$ reaction products
(g) Vacuum dry sample to remove water and other volatiles.

The above treated sample shows a marked reduction of coefficient of friction.

Method C.—In still a further embodiment of our invention, we have discovered a method whereby the reaction products of fluorinated sulfur compounds and vinyl derivatives are directly incorporated into the surface of the elastomeric materials, thereby eliminating both hydrolysis of ester groups and the necessity of utilizing ionizing radiation or thermal initiations. When proceeding according to the instant method the elastomeric material is cleaned and dried as enumerated in Method B and then contacted with a monomer or mixture of monomers, one of which contains at least one carboxylic acid group in the presence of $SF_4$, a mixture of sodium fluoride and sulfur dichloride, or other similar fluorinating agents. By-products may be removed as indicated above in connection with Method B, and examples of the procedures of the instant method are as follows:

C. ACRYLIC ACID—$SF_4$ DIRECT METHODS

Example 13.—Acrylonitrile butadiene rubber (Buna N)

(a) Wash sample with soap and water to remove surface contamination
(b) Rinse sample with acetone to remove oils, waxes, residual soaps and water
(c) Vacuum dry to remove all traces of water
(d) Expose sample to the indirect fluorinating atmosphere generated by .21 mole acrylic acid and .33 mole $SF_4$ for 1 hour at 115° C. and autogeneous pressure
(e) Soak treated sample 2 hours in water to remove soluble $SF_4$ reaction products
(f) Vacuum dry sample to remove water and other volatiles.

A sample thus treated exhibits a marked reduction of coefficient of friction.

Example 14.—Natural rubber (a) Wash sample with soap and water to remove surface contamination
(b) Rinse sample with acetone to remove oils, waxes, residual soaps and water
(c) Vacuum dry to remove all traces of water
(d) Expose sample to the indirect fluorinating atmosphere generated by .21 mole acrylic acid and .33 mole $SF_4$ for 1 hour at 115° C. and autogenous pressure
(e) Soak treated sample 2 hours in water to remove soluble $SF_4$ reaction products
(f) Vacuum dry sample to remove water and other volatiles.

A sample thus treated exhibits a marked reduction of coefficient of friction.

Example 15.—Polychloroprene rubber (a) Wash sample with soap and water to remove surface contamination
(b) Rinse sample with acetone to remove oils, waxes, residual soaps and water
(c) Vacuum dry to remove all traces of water
(d) Expose sample to the indirect fluorinating atmosphere generated by .21 mole acrylic acid and .33 mole $SF_4$ for 1 hour at 115° C. and autogenous pressure
(e) Soak treated sample 2 hours in water to remove soluble $SF_4$ reaction products
(f) Vacuum dry sample to remove water and other volatiles.

A sample thus treated exhibits a marked reduction of coefficient of friction.

Example 16.—SBR rubber (a) Wash sample with soap and water to remove surface contamination
(b) Rinse sample with acetone to remove oils, waxes, residual soaps and water
(c) Vacuum dry to remove all traces of water
(d) Expose sample to the indirect fluorinating atmosphere generated by .21 mole acrylic acid and .33 mole $SF_4$ for 1 hour at 115° C. and autogenous pressure
(e) Soak treated sample 2 hours in water to remove soluble $SF_4$ reaction products
(f) Vacuum dry sample to remove water and other volatiles.

A sample thus treated exhibits a marked reduction of coefficient of friction.

Example 17

(a) Wash sample with soap and water to remove surface contamination
(b) Rinse sample with acetone to remove oils, waxes, residual soaps and water
(c) Vacuum dry to remove all traces of water
(d) Expose sample to the indirect fluorinating atmosphere generated by .21 mole acrylic acid and .33 mole $SF_4$ and catalytic amounts of boron trifluoride for 1 hour at 115° C. and autogenous pressure
(e) Soak treated sample 2 hours in water to remove soluble $SF_4$ reaction products
(f) Vacuum dry sample to remove water and other volatiles.

A sample thus treated exhibits a marked reduction of coefficient of friction.

Example 18

(a) Wash sample with soap and water to remove surface contamination
(b) Rinse sample with acetone to remove oils, waxes, residual soaps and water
(c) Vacuum dry to remove all traces of water
(d) Expose sample to the indirect fluorinating atmosphere generated by .7 mole sulfur dichloride, 2.1 moles sodium fluoride and .21 mole acrylic acid for one hour at 115° C. and autogenous pressure
(e) Soak treated sample 2 hours in water to remove soluble $SF_4$ reaction products
(f) Vacuum dry sample to remove water and other volatiles.

A sample thus treated exhibits a marked reduction of coefficient of friction.

Method D.—In still a further embodiment of our invention, we have discovered a method whereby fluorinated monomers or oligomers are directly incorporated into the surface of the elastomeric materials, thereby eliminating the hydrolysis of ester groups, and fluorination utilizing $SF_4$, a mixture of sodium fluoride and sulfur dichloride, or other similar halogenating agents. When proceeding according to the instant method, the elastomeric material is cleaned and dried as enumerated in Method B and then contacted with a monomer, oligomer or mixtures of these, one of which contains fluorine.

It is understood, of course, that the conditions of contact are varied as to time, temperature, diluents, and the like depending upon the particular elastomeric compound employed. The thus treated elastomeric material is then exposed to ionizing radiation, such as ultraviolet radiation, gamma radiation, or the like. Alternatively, depending upon whether or not a thermal initiator is employed in the monomer contacting step, the thus treated elastomeric material is heated to appropriate temperatures. At this point, depending upon the presence of water or other diluents, the elastomeric material is dried or the surface diluents removed by suitable techniques.

Examples of the procedures according to the instant method are as follows:

D. FLUORINATED MONOMER GRAFTS

Example 19.—Perfluorobutyl acrylate-Natural rubber (a) Wash rubber sample with soap and water to remove surface contamination
(b) Rinse sample with acetone to remove oils, waxes, residual soap and water
(c) Soak sample for 10 minutes in 50% solution of perfluorobutyl acrylate in benzene
(d) Expose sample to ultraviolet light from quartz envelop mercury burner.

A sample treated in the above manner shows a marked reduction of coefficient of friction.

Example 20.—Perfluoropropylene-Natural rubber (a) Wash rubber sample with soap and water to remove surface contamination
(b) Rinse sample with acetone to remove oils, waxes, residual soap and water
(c) Soak sample for 10 minutes in 50% solution of perfluoropropylene in toluene
(d) Expose sample to ultraviolet light from a quartz envelop mercury burner.

A sample treated in the above manner shows a marked reduction of coefficient of friction.

Example 21.—Perfluoropropylene-Acrylonitrile base rubber (Buna N)

(a) Wash rubber sample with soap and water to remove surface contamination
(b) Rinse sample with acetone to remove oils, waxes, residual soap and water
(c) Soak sample for 15 minutes in 50% solution of perfluoropropylene in toluene containing 1% benzoyl peroxide based on perfluoropropylene
(d) Heat treated sample five minutes in oven at 137° C.

A sample treated in the above manner shows a marked reduction of coefficient of friction.

Example 22.—Perfluorobutyl acrylate-Natural rubber (a) Wash rubber sample with soap and water to remove surface contamination
(b) Rinse sample with acetone to remove oils, waxes, residual soap and water
(c) Soak sample for 10 minutes in 50% solution of perfluorobutyl acrylate in toluene containing 1% benzoyl peroxide based on perfluorobutyl acrylate
(d) Heat treated sample 5 minutes in oven at 137° C.

A sample treated in the above manner shows a marked reduction of coefficient of friction.

Example 23.—Perfluorobutyl acrylate-Acrylonitrile rubber (Buna N)

(a) Wash rubber sample with soap and water to remove surface contamination
(b) Rinse sample with acetone to remove oils, waxes, residual soap and water
(c) Soak sample for 10 minutes in a 50% solution of perfluorobutyl acrylate in toluene containing 1% azobisisobutyronitrile based on perfluorobutyl acrylate
(d) Heat treated sample 5 minutes in oven at 137° C.

A sample treated in the above manner shows a marked reduction of coefficient of friction.

Example 24.—Perfluoropropylene-Polychloroprene rubber (a) Wash rubber sample with soap and water to remove surface contamination
(b) Rinse sample with acetone to remove oils, waxes, residual soap and water
(c) Soak sample for 10 minutes in a 50% solution of perfluoropropylene in toluene containing 1% azobisisobutyronitrile based on perfluoropropylene
(d) Heat treated sample 5 minutes in oven at 137° C.

A sample treated in the above manner shows a marked reduction of coefficient of friction.

Method E.—In another embodiment of our invention, we have discovered a method whereby chlorinated monomers or oligomers are directly incorporated into the surface of the elastomeric materials, thereby eliminating the hydrolysis of ester groups and fluorination utilizing $SF_4$, a mixture of sodium fluoride and sulfur dichloride, or other similar fluorinating agents. When proceeding according to the instant method, the elastomeric material is cleaned and dried as enumerated in Method B and then contacted with a monomer, oligomer or mixture of these, one of which contains chlorine. It is understood, of course, that the conditions of contact are varied as to time, temperature, diluents and the like depending upon the particular elastomeric compound employed. Thus treated elastomeric material is then exposed to ionizing radiation, such as ultraviolet radiation, gamma radiation, or the like. Alternatively, depending upon whether or not a thermal initiator is employed in the monomer contacting step, thus treated elastomeric material is heated to appropriate temperatures. At this point, depending upon the presence of water or other diluents, the elastomeric material is dried or the surface diluents removed by suitable techniques.

Examples of the procedures according to the instant method are as follows:

E. CHLORINATED MONOMER GRAFTS

Example 25.—Perchloroethylene-Natural rubber (a) Wash rubber sample with soap and water to remove surface contamination
(b) Rinse sample with acetone to remove oils, waxes, residual soap and water
(c) Soak sample 15 minutes in perchloroethylene
(d) Expose sample for 15 minutes to ultraviolet light from a quartz envelop mercury burner
(e) Soak sample 15 minutes in perchloroethylene
(f) Expose sample for 15 minutes to ultraviolet light from a quartz envelop mercury burner.

A sample treated in the above manner shows a marked reduction of coefficient of friction.

Example 26.—Perchloroethylene-Acrylonitrile base rubber (Buna N)

(a) Wash rubber sample with soap and water to remove surface contamination
(b) Rinse sample with acetone to remove oils, waxes, residual soap and water
(c) Soak sample 15 minutes in perchloroethylene
(d) Expose sample for 15 minutes to ultraviolet light from a quartz envelop mercury burner
(e) Soak sample 15 minutes in perchloroethylene
(f) Expose sample for 15 minutes to ultraviolet light from a quartz envelop mercury burner.

A sample treated in the above manner shows a marked reduction of coefficient of friction.

Example 27.—Perchloroethylene-Polychloroprene rubber (a) Wash rubber sample with soap and water to remove surface contamination
(b) Rinse sample with acetone to remove oils, waxes, residual soap and water
(c) Soak sample 15 minutes in perchloroethylene
(d) Expose sample for 15 minutes to ultraviolet light from a quartz envelop mercury burner
(e) Soak sample 15 minutes in perchloroethylene
(f) Expose sample for 15 minutes to ultraviolet light from a quartz envelop mercury burner.

A sample treated in the above manner shows a marked reduction of coefficient of friction.

Example 28.—Trichloroethylene-Natural rubber (a) Wash rubber sample with soap and water to remove surface contamination
(b) Rinse sample with acetone to remove oils, waxes, residual soap and water
(c) Soak sample 15 minutes in trichloroethylene
(d) Expose sample for 15 minutes to ultraviolet light from a quartz envelop mercury burner
(e) Soak sample 15 minutes in trichloroethylene
(f) Expose sample for 15 minutes to ultraviolet light from a quartz envelop mercury burner.

A sample treated in the above manner shows a marked reduction of coefficient of friction.

Example 29.—Trichloroethylene-Polychloroprene rubber (a) Wash rubber sample with soap and water to remove surface contamination
(b) Rinse sample with acetone to remove oils, waxes, residual soap and water
(c) Soak sample in trichloroethylene
(d) Expose sample for 15 minutes to ultraviolet light from a quartz envelop mercury burner
(e) Soak sample 15 minutes in trichloroethylene
(f) Expose sample for 15 minutes to ultraviolet light from a quartz envelop mercury burner.

A sample treated in the above manner shows a marked reduction of coefficient of friction.

Example 30.—Trichloroethyelne-SBR rubber (a) Wash rubber sample with soap and water to remove surface contamination
(b) Rinse sample with acetone to remove oils, waxes, residual soap and water
(c) Soak sample 15 minutes in trichloroethylene
(d) Expose sample for 15 minutes to ultraviolet light from a quartz envelop mercury burner
(e) Soak sample 15 minutes in trichloroethylene
(f) Expose sample for 15 minutes to ultraviolet light from a quartz envelop mercury burner.

A sample treated in the above manner shows a marked reduction of coefficient of friction.

Method F.—In a still further embodiment of our invention, we have discovered a method whereby vinyl monomers, such as acrylic monomers, allylic monomers and other related monomers, singly or in connection with one another or with oligomers derived from these monomers, which are polymerized by addition polymerization can be directly incorporated into the surface of most any elastomeric material including the aforementioned unsaturated elastomers and, in addition, most of the virtually saturated elastomers such as butyl rubber, silicone rubber, ethylene propylene, Hypalon, fluoro-elastomers, urethanes and the like. When proceeding according to the instant method, the elastomeric material as defined herein is cleaned and dried as enumerated in Method B and then contacted with a monomer or oligomer as defined herein. It is understood, of course, that the conditions of contact are varied as to time, temperature, diluents, and the like, depending upon the particular elastomeric compound employed. The thus treated elastomeric material is then exposed to ionizing radiation, such as ultraviolet radiation, gamma radiation, or the like. Alternatively, depending upon whether or not a thermal initiator is employed in the monomer contacting step, the thus treated elastomeric material is heated to appropriate temperatures. At this point, depending upon the presence of water or other diluents, the elastomeric material is dried or the surface diluents removed by suitable techniques.

Examples of the procedures according to the instant method are as follows:

F. USE OF OTHER MONOMERS

Example 31.—Styrene-Natural rubber (a) Wash rubber sample with soap and water to remove surface contamination
(b) Rinse sample with acetone to remove oils, waxes, residual soap and water
(c) Soak sample 10 minutes in styrene monomer
(d) Expose sample to ultraviolet light from a quartz envelop mercury burner.

A sample treated in the above manner shows a marked reduction of coefficient of friction.

Example 32.—Methylmethacrylate-Polychloroprene rubber (a) Wash rubber sample with soap and water to remove surface contamination
(b) Rinse sample with acetone to remove oils, waxes, residual soap and water
(c) Soak sample 10 minutes in methylmethacrylate
(d) Expose sample to ultraviolet light from a quartz envelop mercury burner.

A sample treated in the above manner shows a marked reduction of coefficient of friction.

Example 33.—Butyl acrylate-SBR rubber (a) Wash rubber sample with soap and water to remove surface contamination
(b) Rinse sample with acetone to remove oils, waxes, residual soap and water
(c) Soak sample 10 minutes in butyl acrylate
(d) Expose sample to ultraviolet light from a quartz envelop mercury burner.

A sample treated in the above manner shows a marked reduction of coefficient of friction.

Example 34.—Ethylacrylate-Natural rubber (a) Wash rubber sample with soap and water to remove surface contamination
(b) Rinse sample with acetone to remove oils, waxes, residual soap and water
(c) Soak sample 10 minutes in styrene monomer containing 1% benzoyl peroxide
(d) Heat treated sample 5 minutes in oven at 137° C.

A sample treated in the above manner shows a marked reduction of coefficient of friction.

Example 35.—Acrylic acid-Acrylonitrile based rubber (Buna N)

(a) Wash rubber sample with soap and water to remove surface contamination
(b) Rinse sample with acetone to remove oils, waxes, residual soap and water
(c) Soak sample 10 minutes in acrylic acid containing 1% benzoyl peroxide
(d) Heat treated sample 5 minutes in oven at 137° C.

A sample treated in the above manner shows a marked reduction of coefficient of friction.

Example 36.—Methyl acrylate-Natural rubber (a) Wash rubber sample with soap and water to remove surface contamination
(b) Rinse sample with acetone to remove oils, waxes, residual soap and water
(c) Soak sample 10 minutes in methyl acrylate containing 1% azobisisobutyronitrile
(d) Heat treated sample 5 minutes in oven at 137° C.

A sample treated in the above manner shows a marked reduction of coefficient of friction.

For the most part, through experimentation and comparison of results, the new surface of Methods A through F has lubricity properties which approach that of Teflon with the basic elasticity and flexibility characteristics virtually unchanged. In the methods set forth above, the treatment of the surface of the elastomeric material was anywhere from 2 to 5 mils with the new polymer built into the surface of the material. Nevertheless, it is to be understood that the depth of treatment can be made to penetrate the surface of the elastomeric materials by altering the soak times, temperatures, etc. The methods have been carried out on products after they have been vulcanized and the results of the processing according to this invention have shown that the bulk dimensions of the products remain fairly constant. Experience dictates that the optimum treatment for a particular product varies from material to material and from product to product, but each method depends to a great measure on the composition of the base elastomeric material.

In comparing the coefficient of friction of the base elastomeric materials with those treated according to the instant invention, it has been observed that the coefficient of friction has been reduced by a factor of one half or greater in Methods A through F. Of course, it is to be understood that the coefficient of friction of elastomeric materials generally depends to a great extent upon the applied loads. It is noted that the applied load is not critical to elastomeric materials that were treated according to this invention, while they were critical to the untreated elastomeric material. Thus, for example, in the case of seals where the starting load is low, the advance is extremely significant because this is usually the time when seals are destroyed, not only because the applied load is small and the friction high, but because in the case of seals, until lubrication is applied to the surface of the seal, the seal must run dry.

In Table I below, representative changes in the physical properties of treated and untreated elastomeric materials are set forth.

TABLE I.—REPRESENTATIVE CHANGES IN PHYSICAL PROPERTIES

| Elastomer | Modulus | | | Tensile | | Shore A | Comp. Set, percent |
|---|---|---|---|---|---|---|---|
| | 100% | 200% | 300% | Percent Elong. | P.s.i. | | |
| Untreated: | | | | | | | |
| Neoprene | 490 | 1,230 | | 250 | 1,630 | 60 | 33 |
| Nitrile Rubber | 150 | 240 | 390 | 700 | 1,200 | 47 | 61 |
| Natural | 300 | 830 | 1,540 | 520 | 3,400 | 57 | 55 |
| SBR | 280 | 730 | 1,480 | 470 | 2,870 | 60 | 62 |
| Treated: | | | | | | | |
| Neoprene | 670 | 1,230 | | 200 | 1,250 | 69 | 61 |
| Nitrile Rubber | 150 | 250 | 400 | 520 | 720 | 44 | 74 |
| Natural | 350 | 800 | 1,500 | 420 | 2,300 | 62 | 67 |
| SBR | 360 | 820 | 1,600 | 410 | 2,250 | 65 | 76 |

From the comparison of data in Table I, it is evident that there are some minor changes in the physical properties of the rubber stock treated according to the instant invention. However, these are primarily attributed to post-cure and the additional vulcanization brought about by the introduction of small amounts of sulfur from the chemical reagents used in the particular methods.

In connection with the wear-resistance of the graft polymeric surfaces resulting from the treatments according to the invention, it is found that these are surprisingly good despite the fact that usually only two to five mils of graft polymerization has been effected.

In other tests, various rubber stock given the treatment according to the invention have held up for more than 200 hours and wear tests at a speed of 114 inches per second and a pressure of 1 pound per square inch have been significant. These high speed tests were made with rotating cylinders and restrictively held samples. The coefficient of friction during this period changed from .26 to .22 after 16 hours and then remained at approximately .2 for the balance of the test period. The amount of material removed from the surface of the samples at the time of failure is an indication of the depth to which effective treatment had penetrated and this is set forth in Table II below.

TABLE II

Average erosion at end of
Elastomer type: high-speed wear test, inches
    Natural _____ .006
    SBR _____ .007
    Neoprene _____ .0025
    Nitrile rubber _____ .0087

It will thus be seen that the objects set forth above, among those made apparent from the preceding description, are efficiently attained and, since certain changes may be made in carrying out the above method and in the composition and articles set forth, without departing from the scope of the invention, it is intended that all matter contained in the above description shall be interpreted as illustrative and not in a limiting sense. For example, the particular unsaturated elastomeric materials alluded to in Methods A through F could be compounded with saturated elastomeric materials so long as a substantial amount of the unsaturated elastomeric materials is employed to carry out the desired degree of polymerization. In Method F, mixtures of elastomers are amenable to treatment according to the instant invention, independent of unsaturation.

What is claimed is:

1. A method for improving the lubricity of the surface of a vulcanized elastomer having residual carbon-carbon unsaturation selected from the group consisting of natural rubber, polychloroprene rubber, styrene butadiene rubber, butadiene acrylonitrile rubber, and polybutadiene, comprising treating said surface with acrylic acid, exposure to an activator selected from the group consisting of ultraviolet radiation, gamma radiation, and heat in the presence of a thermal initiator and heating with a fluorinating agent selected from the group consisting of sulfur tetrafluoride, a complex of sulfur tetrafluoride and boron trifluoride, and, a mixture of sodium fluoride and sulfur dichloride.

2. The method of claim 1 in which the elastomer is cleaned and dried prior to treatment with acrylic acid, dried to remove traces of water prior to treatment with the fluorinating agent, and vacuum dried to remove water and other volatiles following said treatment with said fluorinating agent.

3. The method of claim 1 in which the activator is ultraviolet radiation.

4. The method of claim 1 in which the activator is a thermal initiator consisting of benzoyl peroxide and the treatment involving said thermal initiator is carried out at a temperature of about 100°.

5. A method for improving the lubricity of the surface of a vulcanized elastomer having residual carbon-carbon unsaturation selected from the group consisting of natural rubber, polychloroprene rubber, styrene butadiene rubber, acrylonitrile butadiene rubber, and polybutadiene comprising, in sequence, the steps of:
   (1) cleaning and drying the surface of said elastomer to remove surface contamination,
   (2) soaking said elastomer in acrylic acid for about ½ hr. at approximately 60° C.,
   (3) exposing said soaked elastomer to an activator consisting of ultraviolet radiation,
   (4) drying the surface of said radiated elastomer,
   (5) heating said dried elastomer with a fluorinating agent consisting of sulfur tetrafluoride for one hour at a temperature in the range of about 115 to 125°, and
   (6) vacuum drying the treated elastomer to remove volatiles.

6. The method of claim 5 in which the sulfur tetrafluoride is complexed with boron trifluoride.

7. A method for improving the lubricity of the surface of a vulcanized elastomer having residual carbon-carbon unsaturation selected from the group consisting of natural rubber, polychloroprene rubber, styrene butadiene rubber, acrylonitrile butadiene rubber, and polybutadiene comprising, in sequence, the steps of:
   (1) cleaning and drying the surface of said elastomer to remove surface contamination,
   (2) soaking said elastomer in acrylic acid containing 1 part dissolved benzoyl peroxide per 100 parts acrylic acid for ½ hr.,
   (3) heating said soaked elastomer for ½ hour at 100° C.,
   (4) drying the surface of said soaked elastomer,
   (5) heating said dried elastomer with a fluorinating agent consisting of sulfur tetrafluoride for one hour at a temperature in the range of about 115 to 125°, and
   (6) vacuum drying the treated elastomer to remove volatiles.

8. A method for improving the lubricity of the surface of a vulcanized elastomer having residual carbon-carbon unsaturation selected from the group consisting of natural rubber, polychloroprene rubber, styrene butadiene rubber, acrylonitrile butadiene rubber, and polybutadiene by simultaneous exposure thereof to the vapors of acrylic acid and a fluorinating agent selected from the group consisting of sulfur tetrafluoride, a complex of sulfur tetrafluoride and boron trifluoride, and a mixture of sodium fluoride and sulfur dichloride at a temperature of about 115° C. for one hour followed by soaking with water to remove soluble impurities and vacuum drying.

9. A method for the treatment of a vulcanized elastomer having residual carbon-carbon unsaturation selected from the group consisting of natural rubber, polychloroprene rubber, styrene butadiene rubber, acrylonitrile butadiene rubber, and polybutadiene, comprising the steps of (1) grafting acrylic acid groups to the surface of said elastomer by a process comprising (a) treatment of said surface with acrylic acid; (b) exposure of said treated surface to an activator selected from the group consisting of ultraviolet radiation, gamma radiation, and heat in the presence of a thermal initiator, and (2) heating the acrylic acid modified surface with a fluorinating agent selected from the group consisting of sulfur tetrafluoride, a complex of sulfur tetrafluoride and boron trifluoride, and a mixture of sodium fluoride and sulfur dichloride.

10. The vulcanized elastomeric product produced by the process of claim 1.

References Cited

UNITED STATES PATENTS

| | | | |
|---|---|---|---|
| 2,711,972 | 6/1955 | Miller et al. | 117—62.1 |
| 2,793,964 | 5/1957 | Gilbert et al. | 117—62.1 |
| 2,962,480 | 11/1960 | Borunsky | 204—162.5 |

FOREIGN PATENTS 404,120   1/1934   Great Britain.

OTHER REFERENCES

Nishimoto et al., Chem. Abstracts, vol. 51, col. 9199.
Chapiro, "Radiation Chemistry of Polymeric Systems," Interscience Publ., N.Y., pp. 1 and 654–662.

MURRAY TILLMAN, *Primary Examiner.*

SAMUEL H. BLECH, *Examiner.*

N. F. OBLON, R. B. TURER, *Assistant Examiners.*